Patented Aug. 23, 1949

2,479,999

UNITED STATES PATENT OFFICE 2,479,999

REGENERATION OF CATALYSTS USED IN THE PRODUCTION OF HYDROCARBONS FROM CARBON MONOXIDE AND HYDROGEN

Alfred Clark, Bartlesville, Okla., assignor to Phillips Petroleum Company, a corporation of Delaware No Drawing. Application May 28, 1945,
Serial No. 596,407

7 Claims. (Cl. 260—449.6)

The present invention relates to the conversion of mixtures of hydrogen and carbon monoxide into hydrocarbons containing more than one carbon atom in the molecule. More particularly, the present invention relates to a method for the reactivation of catalysts used in said conversion in order to prolong their useful life and maintain their activity while at the same time improving the efficiency of the process.

When hydrogen and carbon monoxide are caused to react to form hydrocarbons over suitable catalysts and under suitable conditions of temperature and pressure, a gradual decline in activity over relatively short periods of use is observed and the catalyst must be regenerated at intervals of the order of one to four weeks in order to maintain efficient production. This decline in activity is attributed to the accumulation of adsorbed, high-boiling products which condense on the active catalyst surfaces and thereby prevent the functioning of the catalyst with proper efficienecy. These products are generally considered to be of a waxy nature.

It is known that such adsorbed deposits can be removed by treatment of the catalyst with various solvents either at reaction temperature or at atmospheric temperature as indicated by a restoration of the activity of the catalyst after such treatment.

It is also known that the activity of these catalysts can be restored by treatment with pure hydrogen at temperatures considerably in excess of the reaction temperature. It is even known that the activity of these catalysts can be restored by increasing the ratio of hydrogen to carbon monoxide in the synthesis gases from its normal value of 2:1 to at least 2.5:1 during the regeneration period at the same temperature level.

It is an object of the present invention to provide an improved mode of regenerating or reactivating catalysts contaminated in the manner herein described. It is a further object of the present invention to reactivate catalysts employed in the conversion of mixtures of carbon oxides and hydrogen to hydrocarbons without interrupting flow of feed or modifying the composition thereof. Other objects will be apparent from the specification herein.

The function of hydrogen in restoring the activity of catalysts of decreased activity used in the synthesis of hydrocarbons from the interaction of hydrogen and oxides of carbon is known to be more or less specific and not solely a mechanical action of flushing the condensed liquids from the catalyst surface. The hydrogen is known to interact chemically with the adsorbed high boiling substances by a process of successive demethylations wherein methyl groups are split from the long chain, high-boiling adsorbed hydrocarbons thus liberating lower-boiling hydrocarbons and methane from the catalyst surfaces. It is currently postulated that hydrogen must be atomically adsorbed on the catalyst surface in order to carry on this process of demethylation. In fact it is believed that the formation of methane whether by the interaction of hydrogen with adsorbed, high-boiling products or with carbon monoxide can only take place in the presence of atomically adsorbed hydrogen. Under normal reaction conditions, with a ratio of hydrogen to carbon monoxide of 2:1, the carbon monoxide present, it is thought, prevents in great part the atomic adsorption of hydrogen, and thus prevents the formation of methane to a great extent. By increasing the temperature above normal reaction temperature for the production of higher hydrocarbons, a temperature is finally reached at which methane exclusively is formed by the interaction of hydrogen and carbon monoxide.

I have now discovered that at these elevated temperatures, hydrogen appears to be preferentially adsorbed in atomic form over carbon monoxide, and that at these temperatures the hydrogen is capable of reacting with deposited high-boiling products and thus removing them from the catalyst. In accordance with my invention as discussed herein, the activity of a catalyst which has declined after use in a hydrocarbon synthesis in the manner described herein, due to deposition thereon of heavy waxy hydrocarbon material, may be periodically restored without interrupting flow of synthesis gas. This may be accomplished by increasing the temperature of the catalyst during the reactivation period, with the synthesis gas still flowing, until the hydrocarbon content of exit stream consists substantially only of normally gaseous hydrocarbons having from one to four carbon atoms per molecule. In general, depending on the temperature level, the effluent will contain varying proportions of methane and the other gaseous hydrocarbons, with methane predominating. The minimum regenerating temperature to be used in accordance with my invention is defined by the lowest temperature necessary to substantially eliminate the formation of all but normally gaseous hydrocarbons. The actual minimum temperature to accomplish this result will depend on the catalyst used since different catalysts produce higher boiling hydrocarbons at different temperature levels. For a cobalt-thoria-kieselguhr catalyst containing 100 parts of cobalt, 18 parts of thoria and 100 parts of kieselguhr, this temperature is approximately 270° C. For an ordinary iron catalyst, this temperature will be about 300° C. or slightly higher, while for a sintered iron catalyst this temperature will be in the neighborhood of 340° C. Pressures and flow rates used during the reaction may be continued during the reactivation. At the minimum regenerating temperatures referred to, the composition of the effluent gas will be, roughly, from 30–40 per cent methane, 2–5 per cent ethane, 5 per cent unsaturated $C_2$—$C_4$, 5 per cent saturated $C_2$—$C_4$, 15 per cent $H_2$ and the remainder $CO_2$. As the temperature is raised above the minimum regenerating temperature, the proportion of methane will rise, while the proportions of $C_2$—$C_4$ hydrocarbons will decline, until the hydrocarbon produced is essentially methane.

The hydrocarbon synthesis reaction for the production of gasoline range and higher boiling hydrocarbons may be carried out in the manner generally known in the art. In general, using cobalt catalysts or those containing substantial portions thereof, reaction temperatures in the range of 175–225° C. may be used with the optimum temperature being in the neighborhood of 185–190° C. Ordinary iron catalysts operate best in a narrow range close to 240° C. while sintered iron catalysts require temperatures in the neighborhood of 320° C.

The synthesis reaction is usually carried out at atmospheric or medium pressures, depending on the composition of product desired and the catalyst used. A preferred range of pressures suitable for general use is from 5 to 15 atmospheres, but solid and liquid hydrocarbons may be produced in good yields at pressures of atmospheric to 150 atmospheres or higher.

Flow rates are variable, depending also on catalyst, cooling means used and products desired. Increasing contact time results in a lower catalyst operating temperature and higher yields per pass with less formation of methane. In order to obtain a satisfactory rate of production suitably rapid flow rates must be provided. With cobalt catalysts, for example, space velocities of about 95–115 cubic feet of synthesis gas per hour per cubic foot of catalyst are usually preferred. A space velocity of 113 cubic feet gives a conversion of about 70 per cent per pass at 185° C. With sintered iron catalysts, much higher space velocities may be used, and velocities of 10,000–30,000 cubic feet of synthesis gas per hour per cubic foot of catalyst have given satisfactory results.

Since the reaction is highly exothermic, cooling means must ordinarily be provided. Such means include cooling tubes through which water or other cooling fluid is circulated such tubes being positioned in or surrounding the catalyst zone. The use of direct heat exchange with nonreactive liquids directly introduced into the reaction zone has also been suggested.

The synthesis gas is usually composed of 2 parts of hydrogen to 1 of carbon monoxide. For iron catalysts which produce large amounts of $CO_2$ however the optimum ratio is 3 parts of hydrogen to 2 parts of carbon monoxide. However the composition of the synthesis gas may vary from 1 to 3 parts of hydrogen for each part of CO.

In addition to the iron, and cobalt catalyst referred to herein, other desirable catalysts include nickel-manganese-alumina on kieselguhr, nickel-thoria on kieselguhr, and cobalt-thoria-copper on kieselguhr.

In a typical method of operating the present invention, a synthesis gas is contacted with catalyst in a reaction chamber cooled by indirect heat exchange with a cooling fluid surrounding the reaction zone, at reaction temperatures and pressures until the activity of the catalyst has begun to decline substantially as the result of the deposition of waxy material on the catalyst. This decline in activity may not be appreciable until the catalyst has been in use for a period of several days to several weeks or more depending on the conditions of operation and catalyst used. At this point the temperature of the catalyst bed is increased, as by permitting it to rise by cutting down flow of cooling fluid, until methane and steam are the predominant reaction products formed as stated above. This may take several hours. Other means of heating may be provided, as by introducing heating fluid into the heat exchange means.

In order to allow every section of the catalyst to come into contact with a gas rich in hydrogen, the rate of flow of the synthesis gases may be increased considerably in order to reduce the conversion per pass, removing the water formed, recycling and maintaining constant proportions of hydrogen, methane and carbon monoxide, or the direction of flow of the synthesis gases may be reversed periodically using substantially the same rate of flow as during the reaction cycle.

The gases issuing from the reaction chamber which contain appreciable methane may be recycled to the synthesis gas producer for reconversion into hydrogen and carbon monoxide by well-known methods.

*Example*

A synthesis gas containing 32.5 per cent of carbon monoxide and 65.5 per cent of hydrogen, together with about 2 per cent of inert constituents, was contacted with a mass of catalyst consisting of 100 parts of cobalt, 18 parts of thorium oxide, and 100 parts of kieselguhr at a temperature of 246 C. The temperature was maintained by circulating cooling water in a spaced zone surrounding the catalyst. A pressure of 100 p. s. i. gage was utilized. The space velocity was 100 and flow was continued continuously for a period of two weeks. At this point a decline in yield of liquid hydrocarbons was noted due to deposition on the catalyst of heavy waxy materials. The temperature of the catalyst was then permitted to gradually rise to 308° C. by cutting down the flow of cooling water, while continuing the flow of synthesis gas, and the temperature was maintained at this level until analysis of the product issuing from the reactor showed that the hydrocarbons produced consisted essentially of methane and ethane, and was continued for about five hours. The effluent gas was analyzed and found to have the following composition: $O_2$, 6.1%; $CO_2$, 13%; olefines, 0.4%; $H_2$, 9.4%; CO, 1.1%; methane, 62%; ethane, 6.9%. At this point a sample of the catalyst was substantially free of waxy deposit and the synthesis reaction was then continued by cooling the catalyst down to the reaction temperature of 246° C. The reaction products of the synthesis with both the fresh and the reactivated catalyst in ml. per cubic meter of synthesis gas were as follows:

| | |
|---|---|
| Solid and liquid hydrocarbon | 90 |
| Oils boiling above 200 C | 20 |
| Gasoline boiling below 200 C | 41 |
| Gaseous hydrocarbons (including $C_3$ and $C_4$) | 5 |
| Paraffin wax | 25 |

In this way the catalyst was effectively reactivated while continuing the flow of synthesis gas.

I claim:

1. In the synthesis of hydrocarbons having more than one carbon atom to the molecule by flowing a synthesis gas mixture containing an oxide of carbon and hydrogen, over a catalyst for said synthesis under conditions of temperature and pressure suitable therefor, and wherein the catalyst is deactivated by the deposition thereon of high-boiling waxy material during said synthesis, the improvement which comprises periodically reactivating said catalyst by increasing the reaction temperature during the course of said reaction to a point at which the hydrocarbon product formed consists essentially of methane, while continuing the flow of said synthesis gas mixture without substantially increasing the hydrogen to carbon monoxide molar ratio, until said waxy deposit is removed, reducing the temperature to a temperature at which hydrocarbons having more than one carbon atom to the molecule are synthesized, and continuing said hydrocarbon synthesis reaction.

2. A process for the synthesis of normally liquid and solid hydrocarbons which comprises contacting a suitable catalyst with a synthesis gas mixture comprising carbon monoxide and hydrogen at a reaction temperature below that at which normally gaseous hydrocarbons would be substantially exclusively formed until the catalyst is at least partially deactivated by deposition of high boiling material thereon, reactivating said catalyst by increasing the reaction temperature to a temperature at which normally gaseous hydrocarbons are formed to the substantial exclusion of higher boiling hydrocarbons while continuing the flow of synthesis gas without substantially increasing the hydrogen to carbon monoxide molar ratio for a period of time sufficient to remove deposited high-boiling material from said catalyst, reducing the temperature to the first named reaction temperature and continuing the synthesis of said normally liquid and solid hydrocarbons without interruption of flow of synthesis gas.

3. A process according to claim 2 in which the catalyst comprises metallic cobalt and wherein the reactivation temperature is at least 270° C.

4. A process according to claim 2 in which the catalyst comprises metallic iron and wherein the reactivation temperature is at least 300° C.

5. A process according to claim 2 in which the catalyst comprises sintered iron and wherein the reactivation temperature is at least 340° C.

6. A process for the preparation of organic compounds by the reduction of carbon monoxide with hydrogen which comprises contacting a suitable catalyst with a gas mixture comprising hydrogen and carbon monoxide in a molar ratio within the range of 1.5 to 2 mols of hydrogen per mol of carbon monoxide at a reaction temperature below that at which normally gaseous hydrocarbons would be substantially exclusively formed until the catalyst is at least partially deactivated by deposition of high boiling material thereon, increasing the reaction temperature to a temperature at which normally gaseous hydrocarbons are formed to the substantial exclusion of higher boiling hydrocarbons while continuing the flow of said synthesis gas for a period of time sufficient to remove deposited high boiling material from said catalyst, reducing the temperature to the first named reaction temperature and continuing reduction of carbon monoxide with hydrogen without interruption of the flow of synthesis gas.

7. A process according to claim 6 wherein the molar ratio of hydrogen to carbon monoxide is 2:1.

ALFRED CLARK.

REFERENCES CITED

The following references are of record in the file of this patent:

UNITED STATES PATENTS

| Number | Name | Date |
|---|---|---|
| 1,746,464 | Fischer et al. | Feb. 11, 1930 |
| 2,251,554 | Sabel et al. | Aug. 5, 1941 |
| 2,257,457 | Fischer et al. | Sept. 30, 1941 |
| 2,360,787 | Murphree et al. | Oct. 17, 1944 |
| 2,369,956 | Feisst et al. | Feb. 20, 1945 |

OTHER REFERENCES

Ellis, "The Chemistry of Petroleum Derivatives," vol. II, Reinhold, N. Y., pages 1240, 1241.

Fischer et al., "National Petroleum News," Oct. 13, 1926, pages 95, 96 and 99.